(No Model.)
B. F. ALLEN.
WASHER FOR CARRIAGE AXLES.
No. 249,151.  Patented Nov. 8, 1881.
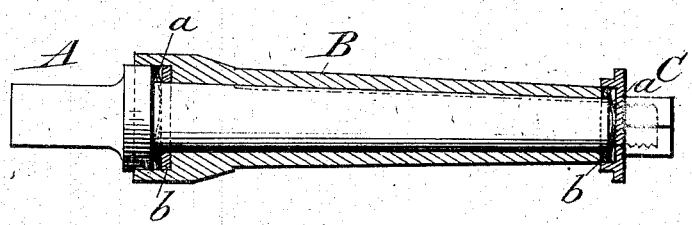
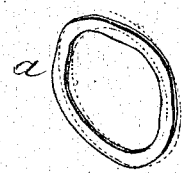 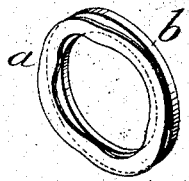
Attest:
F. H. Schott
W. C. Chaffe
Benjamin Franklin Allen
Inventor:

UNITED STATES PATENT OFFICE.

BENJAMIN F. ALLEN, OF BOSTON, MASSACHUSETTS.

WASHER FOR CARRIAGE-AXLES.

SPECIFICATION forming part of Letters Patent No. 249,151, dated November 8, 1881.

Application filed September 29, 1881. (No model.)

*To all whom it may concern:*

Be it known that I, BENJAMIN F. ALLEN, a citizen of the United States of America, residing at Boston, in the county of Suffolk and State of Massachusetts, have invented certain new and useful Improvements in Washers for Carriage-Axles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in the devices used for maintaining a proper relation between the axle of a carriage and the hub of a wheel revolving thereon, the object being to so arrange the parts that the hub shall be held tightly between the washers upon the axle, but at the same time shall have a slight longitudinal motion thereon in connection with said washers, as they may be alternately compressed; and the invention consists in the combination, with the axle and axle-box of a carriage, of washers composed of a soft-metal ring which receives the wear and a corrugated steel ring by which the needed elasticity is supplied.

In the drawings, Figure 1 is a side view of the axle with a longitudinal section of the axle-box, showing the relative positions of the several parts as arranged for use. Fig. 2 is a perspective view of the corrugated ring; and Fig. 3 shows both the soft-metal and corrugated rings in position, forming the elastic washer.

A represents the axle; B, the axle-box, and C the nut by which the box is held upon the axle. As all these parts are of ordinary construction, they need no detailed description. Experience has taught me that if I make the axle-box of such length as to completely fill the space between the nut and the shoulders upon the axle, so that the axle-box and hub can have no end-play, the result is a hard-running vehicle, as the wheel cannot adjust itself to the lateral inequalities of the surface over which it travels without carrying the whole carriage with it, thus producing a strain which not only increases the power required to propel the vehicle, but acts injuriously upon the wheels by working the spokes loose and otherwise causing a general disarrangement of its structure. In order to avoid these difficulties it is common to make the axle-box shorter than the bearing portion of the axle between the shoulder and nut. This allows end-play, and obviates the difficulties above named, but is attended with the disagreeable alternative of causing a chucking noise as the ends of the axle-box strike against the shoulder or nut. To avoid this leather washers have been used by placing them upon the axle at each end of the box; but this material does not possess sufficient elasticity to completely obviate the defect. A metallic spring-washer has also been suggested, but, so far as my knowledge extends, has not been received into public favor or gone into general use, from defects in its construction which rendered it less reliable than the leather washer.

In order to construct a metallic washer that shall possess the necessary qualifications to meet the requirements of the situation, I use a corrugated steel annulus or ring, $a$, constructed as shown in Fig. 2—that is, after the annulus has been cut from a sheet of metal it is crimped radially, so as to present a waved peripheral line, and then tempered. This gives it great elasticity, as it may, under sufficient pressure, be completely flattened out, but will at once resume its normal shape when the pressure is removed. As the corrugated surface of the steel ring would not be a suitable one to receive the friction of the ends of the rotating axle-box, I place between them a soft-metal wearing-ring, $b$. This ring may be of copper or any composition metal embodying the necessary elements of softness and ability to withstand wear—such as Babbitt metal and many of the alloys of copper. When placed upon the axle these compound washers will take up the space at each end of the axle-box between the shoulder and nut, so that the axle-box will always be clamped by them, but at the same time will have an endwise movement equal to the compressibility of the corrugated rings.

Having thus described my invention, I claim as new, and desire to secure by Letters Patent of the United States, the following:

As an improvement in washers for carriage-axles, the combination of the corrugated elastic ring with a soft-metal wearing-ring, substantially as shown and described.

In testimony whereof I affix my signature in presence of two witnesses.

BENJ. FRANKLIN ALLEN.

Witnesses:
W. C. DUVALL,
JAS. H. MARR.